(12) United States Patent
Calvin

(10) Patent No.: US 12,049,587 B2
(45) Date of Patent: Jul. 30, 2024

(54) POLYMERIZED ALKALI SILICATE GELS FOR USE IN SUBTERRANEAN FORMATIONS

(71) Applicant: Halliburton Energy Services, Inc., Houston, TX (US)

(72) Inventor: James Eldon Calvin, Oklahoma City, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 190 days.

(21) Appl. No.: 17/564,649

(22) Filed: Dec. 29, 2021

(65) Prior Publication Data
US 2023/0203362 A1 Jun. 29, 2023

(51) Int. Cl.
*C09K 8/504* (2006.01)
*C01B 33/32* (2006.01)
*C09K 8/516* (2006.01)

(52) U.S. Cl.
CPC .......... *C09K 8/5045* (2013.01); *C01B 33/325* (2013.01); *C09K 8/516* (2013.01)

(58) Field of Classification Search
None
See application file for complete search history.

(56) References Cited

U.S. PATENT DOCUMENTS

| | | | | |
|---|---|---|---|---|
| 4,215,001 A * | 7/1980 | Elphingstone | ........... | C09K 8/74 507/923 |
| 2005/0194142 A1 * | 9/2005 | Nguyen | ................... | C09K 8/62 507/222 |
| 2009/0314493 A1 * | 12/2009 | Harris | .................. | C01B 33/325 166/305.1 |
| 2011/0315382 A1 * | 12/2011 | Hutchins | ................ | C09K 8/512 166/295 |
| 2018/0238158 A1 * | 8/2018 | Inyang | .................... | E21B 43/26 |
| 2021/0270116 A1 * | 9/2021 | Johnson | .................. | E21B 47/11 |

OTHER PUBLICATIONS

Halliburton, EquiSeal Conformance Service, H012163, Mar. 2016.
Halliburton, Conformance, Injectrol Service, H01949, Oct. 2007.
Halliburton, Safety Data Sheet, FLO-CHEK® P, Mar. 2015.
Halliburton, Safety Data Sheet, FLO-CHEK® Chemical A, Feb. 2022.

* cited by examiner

*Primary Examiner* — Robert S Loewe
(74) *Attorney, Agent, or Firm* — Thomas Rooney; C. Tumey Law Group PLLC

(57) ABSTRACT

The present disclosure provides methods that use polymerized alkali silicate gels. An example method comprises: introducing a polymerized alkali silicate gel into a subterranean formation containing a fault, wherein the polymerized alkali silicate gel is introduced the subterranean formation such that at least a leading edge of polymerized alkali silicate gel is placed in the fault or within about 10 miles from the fault.

20 Claims, 3 Drawing Sheets

POLYMERIZED ALKALI SILICATE GELS FOR USE IN SUBTERRANEAN FORMATIONS

After a well bore is drilled, it may be necessary to fracture the subterranean formation to enhance hydrocarbon production. This may be of greater importance in shale formations that typically have high-closure stresses. Access to the subterranean formation can be achieved by first creating an access conduit (e.g., perforations) from the well bore to the subterranean formation. Then a fracturing fluid, called a pad, may be introduced at pressures exceeding those required to maintain matrix flow in the subterranean formation to create or enhance at least one fracture that propagates from the well bore. The pad fluid may be followed by a fracturing fluid that includes proppant that are deposited into the fracture or fractures. The proppant may hold the fracture (or fractures) open, thereby maintaining the ability for hydrocarbons to flow through the fracture(s) to ultimately be produced at the surface.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
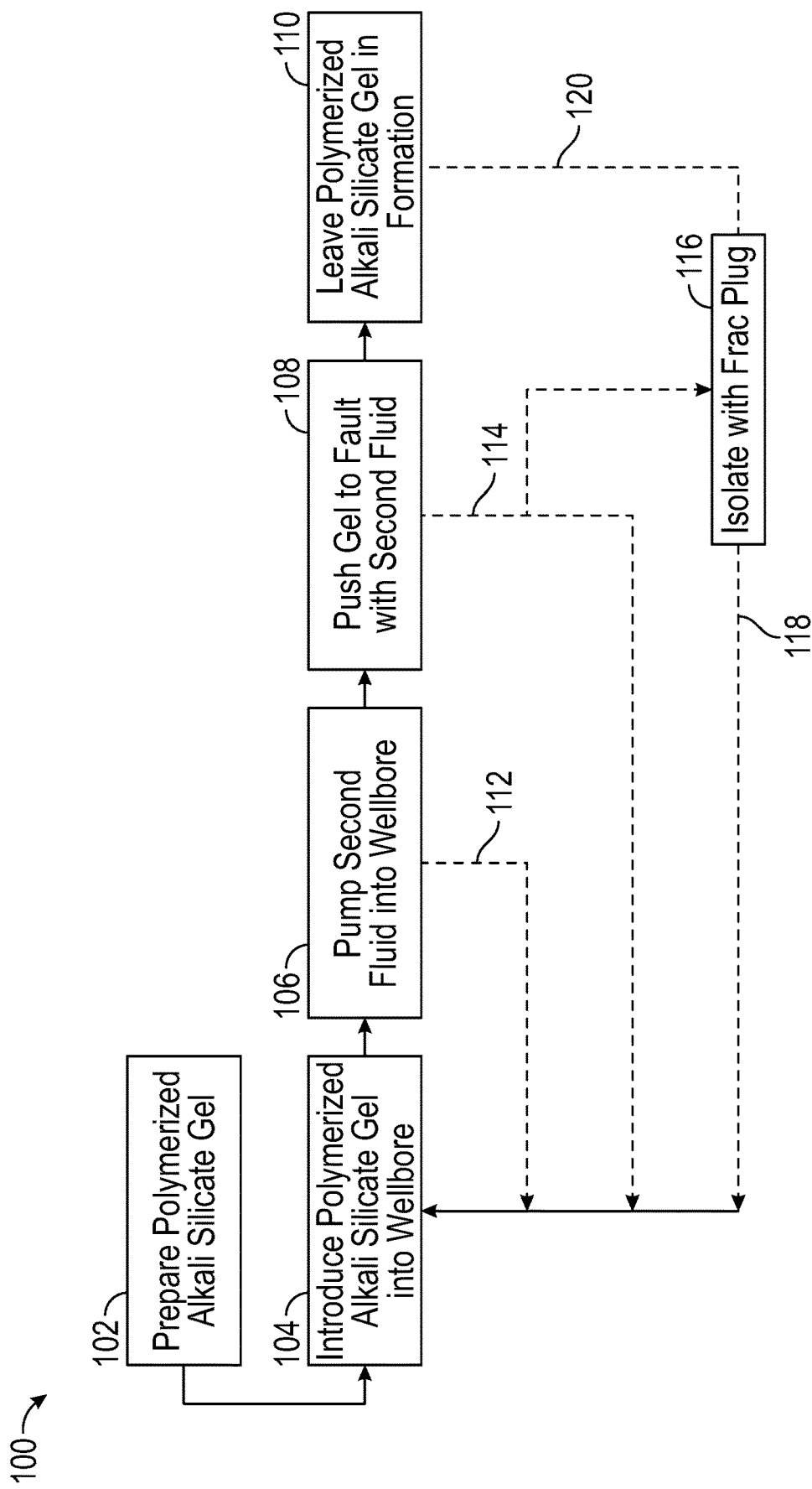
FIG. 1 illustrates a process flow diagram in accordance with some embodiments of the present disclosure.

Disclosed herein are methods, compositions, and systems, and, more particularly, example embodiments disclose stabilization around subterranean wellbores by injection of a polymerized alkali silicate gel. The polymerized alkali silicate may be injected into a fault directly or into a formation near the fault to create a barrier between the wellbore and a given fault.

In some examples disclosed herein, the polymerized alkali silicate gel may be introduced into the subterranean formation in a fracturing treatment. In a fracturing treatment, for example, the polymerized alkali silicate gel may be introduced into the subterranean formation through the wellbore, for example, as a pre-pad fluid. In other examples disclosed herein, the polymerized alkali silicate gel may be injected in the formation via an offset wellbore to a stimulation wellbore. In some embodiments, the polymerized alkali silicate gel may be introduced into the formation at matrix flow rates below fracturing pressure. In alternative embodiments, the polymerized alkali silicate gel may be introduced into the formation at or above fracturing pressure. The polymerized alkali silicate gel may be used any suitable wellbore, including case or uncased wellbores, as well as horizontal, vertical, or otherwise deviated wellbores.

The polymerized alkali silicate gel may be used for stabilization of fault lines in the subterranean formation. In some embodiments, the polymerized alkali silicate gel may be placed into one or more faults in the stabilization. In some embodiments, the polymerized alkali silicate gel may not be placed into the fault but can be placed into a subterranean formation near the fault. For example, a leading edge of the polymerized alkali silicate may be within about 10 miles of the fault, within about 5 miles of the fault, or within about 1 mile of the fault. By way of further example, the polymerized alkali silicate gel may be placed into one or more natural fractures in fluid communication with the fault. After placement of the polymerized alkali silicate gel, one or more fracturing fluid may be introduced into the subterranean formation at or above a fracturing pressure to create or extend one or more fractures in the subterranean formation. By being placed into or near the fault, the polymerized alkali silicate gel may provide a barrier between the fault and the subsequent fracturing treatment. In some embodiments, the polymerized alkali silicate gel may be placed by way of the same wellbore as the fracturing fluid. In some embodiments, the polymerized alkali silicate gel may be placed by way of an offset well to the stimulation wellbore through which the fracturing fluid was introduced.

The polymerized alkali silicate gel may remain in the subterranean formation for a prolonged period of time. As disclosed herein, a prolonged period of time may be 30 days or more, 60 days or more, 90 days or more, 6 months or more, or 1 year or more. By comparison, fracturing fluids generally may be removed within 30 days of placement into a subterranean formation, whereas the polymerized alkali silicate fluids disclosed herein may remain in the subterranean formation up to and during production operations.

The polymerized alkali silicate gel may provide a plurality of benefits and features. For example, the polymerized alkali silicate gel may have a high yield point and high viscosity in an almost solid-like state, allowing them to function as a semi-solid barrier or sealant and thus provide an effective barrier between the fault line and the stimulation wellbore. Advantageously, the polymerized alkali silicate gel may contribute to significantly less damage to the subterranean formation for oil and gas production than other gels that could be used, such as gels based on guar, polyacrylamide, or polysaccharide. In addition, the polymerized alkali silicate gel may provide higher regained permeabilities wherein this feature may be beneficial when the treatment fluid is being injected into the same formation that may be targeted for production. Moreover, the polymerized alkali silicate gel disclosed herein may be premixed or pumped on-the-fly with current fracturing and/or cementing equipment.

Polymerized alkali silicate gels are generally a silicate hydrogel formed from an alkali metal silicate. An alkali metal silicate may have the formula $SiO_2:M_2O$, wherein M is the alkali metal. A specific example of an alkali silicate is Na2SiO3 (as listed below). The polymerized alkali metal silicate gel may be formed from an acid silicate reaction that also forms a salt. In some embodiments, the polymerized alkali silicate forming the gel may have repeating units of the structure shown below:

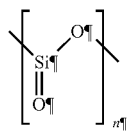

Wherein n ranges from 10 to 100,000, for example. The extent of the polymerization depends on a number of factors, including the concentration of the silicate and/or acid in the solution.

In some embodiments, the polymerized alkali silicate gel may be formed by combining an aqueous alkali metal silicate with an aqueous acid with shearing of the resultant mixture. In some embodiments, shearing may be performed during polymerization, for example, to impart thixotropic properties on the result gel. The resultant polymerized alkali silicate gel can be sheared, for example, with the addition of additional water. In some embodiments, the aqueous acid may lower the pH of the aqueous alkali metal silicate from a pH of about 11 to produce the polymerized alkali silicate gel. In some embodiments, the pH may be lowered to about 2 to about 8.5, for example, about 2 to about 7 or about 7.5 to about 8.5. A lower pH may result in slower gel formation, which may be desired in some applications.

Examples of suitable alkali metal silicates include sodium silicate, potassium silicate, lithium silicate, rubidium silicate, cesium silicate, and combinations thereof. For example, the alkali silicate may include sodium silicate, such as a sodium silicate having an $Na_2O:SiO2$ weight ratio ranging from abut 1:2 to about 1:4. The alkali metal silicate may be provided in an aqueous solution. The alkali metal silicate may be present in the aqueous solution in an any suitable amount, including an amount range from about 20% to about 50% by weight of the aqueous solution.

The acid may include any of a variety of acids suitable for lowering the pH of the alkali metal silicate solution. Examples of suitable acids include inorganic acids, such as hydrochloric acid, sulfuric acid, and nitric acid. Examples of suitable acids further include organic acids, such as formic and acetic acid. Acid-forming materials can also be used, such as benzotrichloride. In some embodiments, additional acid may be used, for example, to provide an excess acid in the reaction mixture of about 1% to about 30% by weight of the reaction mixture or about 1% to about 5% by weight of the reaction mixture. It should be understood that hydrofluoric acids can undesirable interact with silicate so generally should not be used in gel formation.

In some embodiments, the polymerized alkali silicate gel may further include a gelling agent. The gelling agent may further increase the viscosity of the polymerized alkali silicate gel, for example, by hydrating with free water contained in the polymerized alkali silicate gel. Examples of suitable gelling agents include polysaccharides and polyacrylamides. Examples of suitable polysaccharides include galactomannan gums and derivatives thereof, glucomannan gums and derivatives thereof, and cellulose derivatives are particularly suitable. Specific examples of suitable gelling agents include guar gum, locust bean gum, karaya gum, hydroxypropyl guar gum, carboxymethylhydroxypropyl guar gum, carboxymethylcellulose, carboxymethylhydroxyethylcellulose and hydroxyethylcellulose. Combinations of gelling agents may also be used.

Where excess acid is used or the gel may have a lower pH, it should be understood that certain gelling agents may degrade over time causing the gel to thin out. Accordingly, gelling agents with surface active properties (also referred to as surfactant gelling agents) may be used, in some embodiments. Examples of suitable surfactant gelling agents include ethoxylated aliphatic amines, ethoxylated aromatic amines, polyvinylpyrrolidine, and biopolymers such as xanthan gum.

Where used, the gelling agent (whether surface active or not) may be included in the polymerized alkali silicate gel in any suitable amount. For example, the gelling agent may be present in the polymerized alkali silicate gel in an amount of about 0.1% to about 10% by weight of the polymerized alkali silicate gel. In some embodiments, the gelling agent may be present in the polymerized alkali silicate gel in an amount of about 0.1% to about 5% by weight of the polymerized alkali silicate gel The polymerized alkali silicate gel may further include any of a variety of additives that may be suitable for use in subterranean operations. In some embodiments, the additives may be added after shearing. Examples of suitable additives may include as surfactants, proppant (e.g., sand), and degradable diverters. In some embodiments, the polymerized alkali silicate gel may be proppant free. Additional additives may include biocides, scale inhibitors, buffering agents, clay stabilizers, oxidizing breakers, oxygen scavengers, enzyme breakers, foaming agents, CO2, N2, natural gas, petroleum liquids, borate crosslinkers, metal crosslinkers, iron control agents, anti-sludging agents, H2S scavengers, corrosion inhibitors, and resins. Combinations of these additive may also be used.

In some embodiments, the proppant may include fine mesh proppant having a mesh size of about 100 mesh or smaller, based on the U.S. standard sieve opening sizes. Degradable diverters may include degradable polymers, such as materials, such as polysaccharides; lignosulfonates; chitins; chitosans; proteins; proteinous materials; fatty alcohols; fatty esters; fatty acid salts; aliphatic polyesters; poly (lactides); poly(glycolides); poly(ε-caprolactones); polyoxymethylene; polyurethanes; poly(hydroxybutyrates); poly (anhydrides); aliphatic polycarbonates; polyvinyl polymers; acrylic-based polymers; poly(amino acids); poly(aspartic acid); poly(alkylene oxides); poly(ethylene oxides); polyphosphazenes; poly(orthoesters); poly(hydroxy ester ethers); polyether esters; polyester amides; polyamides; polyhydroxyalkanoates; polyethyleneterephthalates; polybutyleneterephthalates; polyethylenenaphthalenates, and copolymers, blends, derivatives, or combinations thereof. In an embodiment, the degradable polymer includes substituted or unsubstituted lactides, glycolides, polylactic acid (PLA), polyglycolic acid (PGA), copolymers of PLA and PGA, copolymers of glycolic, acid with other hydroxy-, carboxylic acid-, or hydroxycarboxylic acid-containing moieties, copolymers of lactic acid with other hydroxy-, carboxylic acid-, or hydroxycarboxylic acid-containing moieties, or combinations thereof.

Where used, the degradable diverters may have an average particle size ranging from about 0.1 micron to about 5000 microns, alternatively from about 5 microns to about 2000 microns, alternatively from about 1 micron to about 500 microns, or alternatively from about 10 microns to about 100 microns. The average particle size of the SDDM may be determined using any suitable methodology or instrumentation such as a Malvern particle size analyzer. While the proppant and degradable diverter are described as being present in the polymerized alkali silicate gel, example embodiments may include introduction of a proppant and/or degradable diverter into the formation ahead of the polymerized alkali silicate gel. For example, the proppant and/or degradable diverter may be placed into a fault or into a formation near the fault ahead of the polymerized alkali silicate gel. In some embodiments, the proppant and/or degradable divert may be placed into the fault or into a formation near the fault behind the polymerized alkali silicate gel.

As previously mentioned, the polymerized alkali silicate gel may have a high yield point and high viscosity, for example, to provide a solid-like state when placed in the formation. The properties of the polymerized alkali silicate gel will depend on a number of factors, including the particular alkali silicate used, time and degree of shearing, and pH, among others. In some embodiments, the polymerized alkali silicate gel may have a viscosity of about 20 centipoise to 200,000 centipoise or about 20 centipoise to about 100,000 centipoise, or about 20 centipoise to about 10,000 centipoise, or about 20 centipoise to about 100 centipoise. In some embodiments, polymerized alkali silicate gel may have a yield point of about 1 lb/100 ft$^2$ to about 200 lb/100 ft$^2$ (about 0.5 Pascals to about 100 Pascals) about 2 lb/100 ft$^2$ to about 60 lb/100 ft$^2$ (about 1 Pascal to about 3 Pascals) or about 10 lb/100 ft$^2$ to about 50 lb/100 ft$^2$ (about 5 Pascals to about 25 Pascals). As used herein, viscosity and yield point refer to fluid rheological properties as measured on a Model 35 FANN viscometer at room temperature and 300 rpm with a standard bob and sleeve in accordance with API Recommended Practice 10B-2.

The polymerized alkali silicate gel may have any suitable pH. For example, the polymerized alkali silicate gel may have a pH of about 2 to about 8.5, about 2 to about 7 or about 7.5 to about 8.5. The pH may depend, for example, on the particular technique used for preparation of the polymerized alkali silicate gel.

The polymerized alkali silicate gels disclosed herein may be prepared in any suitable manner as desired for a particular application. For example, the polymerized alkali silicate gels may be prepared in batch at the surface or they may be prepared continuously while being pumped or otherwise introduced into a subterranean well formation. In some embodiments, the polymerized alkali silicate gel may be prepared at the surface. For example, the alkali silicate, acid, and additional components, such as gelling agent, may be mixed at the surface to form the alkali silicate gel. In some embodiments, or more components of the alkali silicate gel may be pumped separately such that they mix while being pumped to form the alkali silicate gel. For example, an alkali silicate solution and an acid may separately such that they mix to form the alkali silicate gel while be delivered to the subterranean formation.

After being introduced into the formation, the polymerized alkali silicate gel may dehydrate at a relatively rapid rate, and consequently it may not be necessary to include a chemical for breaking the alkali silicate gel in the fluids. The time required for the gel to dehydrate depends on the rate of water loss to the formation and other factors. Upon dehydrating, some powdered silicate may remain in the treated formation. Prior to the dehydration of the polymerized alkali silicate gel, it may retain excellent stability, i.e., retains its high viscosity over a wide temperature range (up to about 500° F. (260° C.). The polymerized alkali silicate gels may be particularly suitable for use in subterranean formations of low permeability in that they may be relatively non-damaging as compared to conventional fluids to such formations as they do not appreciably reduce the permeability thereof.

A second fluid, the flush fluid, may be introduced into the wellbore after the introduction of the polymerized alkali silicate gel, wherein the second fluid may assist in pushing the polymerized alkali silicate gel further into the subterranean formation. For example, the polymerized alkali silicate gels may be directed further into the subterranean formation by pressure exerted by the second fluid. In some embodiments, the second fluid may include a base fluid, an acid, and one or more optional additives. Examples of suitable base fluid may include, for example, fresh water; produced water, natural gas, carbon dioxide, nitrogen, and combinations thereof. Where used, the produced water may be from oil and gas wells, injection wells, and/or enhanced oil recovery (EOR) wells. The base fluids may be present, for example, in the second fluid in an amount of about 0.1% to about 100% by weight of the second fluid.

The acid in the second fluid may include any of a variety of acids suitable for use in subterranean operations. The acid may be the same of a different acid than the acid used in formation of the polymerized alkali silicate gel. Examples of suitable acids include inorganic acids, such as hydrochloric acid, sulfuric acid, and nitric acid. Additional examples of suitable acids further include organic acids, such as formic and acetic acid. Where used, the acid may be present in the second fluid, for example, in an amount of about 0.1% to about 100% by weight of the second fluid.

One or more additional additives may be included in the second fluid as desired for a particular application. Examples of suitable additives may include surfactants, proppant (e.g., sand), and degradable diverters. In some embodiments, the proppant may include fine mesh proppant having a mesh size of about 100 mesh or smaller, based on the U.S. standard sieve opening sizes. Degradable diverters may include degradable polymers, such as materials, such as polysaccharides; lignosulfonates; chitins; chitosans; proteins; proteinous materials; fatty alcohols; fatty esters; fatty acid salts; aliphatic polyesters; poly(lactides); poly(glycolides), poly(ε-caprolactones); polyoxyethylene; polyurethanes; poly(hydroxybutyrates); poly(anhydrides); aliphatic polycarbonates, polyvinyl polymers; acrylic-based polymers; poly(amino acids); poly(aspartic acid); poly(alkylene oxides); poly(ethylene oxides); polyphosphazenes; poly(orthoesters); poly(hydroxy ester ethers); polyether esters; polyester amides; polyamides; polyhydroxyalkanoates; polyethyleneterephthalates; polybutyleneterephthalates; polyethylenenaphthalenates, and copolymers, blends, derivatives, or combinations thereof. In an embodiment, the degradable polymer includes substituted or unsubstituted lactides, glycolides, polylactic acid (PLA), polyglycolic acid (PGA), copolymers of PLA and PGA, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, or combinations thereof. The degradable diverters may an average particle size ranging from about 0.1 micron to about 5000 microns, alternatively from about 5 microns to about 2000 microns, alternatively from about 1 micron to about 500 microns, or alternatively from about 10 microns to about 100 microns. The average particle size of the SDDM may be determined using any suitable methodology or instrumentation such as a Malvern particle size analyzer.

Turning now to the Figures, FIGS. 1-5 illustrate how the polymerized alkali silicate gels disclosed herein may be used. FIG. 1 is a process flow diagram illustrating a method 100 in accordance with some embodiments of the present disclosure. Method 100 depicts a main process flow path including at least 5 stages in addition to an optional process flow path that may be repeated as needed for a particular fracturing operation. As illustrated, the method 100 may include preparing the polymerized alkali silicate gel at block 102. The polymerized alkali silicate gel may be prepared as described herein. For example, the polymerized alkali silicate gel may be prepared at the surface by combination an alkali metal silicate, acid, and one or more optional components. By way of further example, the polymerized alkali silicate gel may be prepared by separately pumping the gel components (e.g., acid and alkali metal silicate) whereby they mix to form the polymerized alkali silica gel while traveling downhole. Where separate components are pumped, additional additives (e.g., gelling agent) for the polymerized alkali silicate gel may include in the acid, in the alkali metal silicate, or both. As illustrated, the method 100 may further include introducing the polymerized alkali silicate gel in a wellbore, at block 104. The polymerized alkali silicate gel may be introduced, for example, by pumping the polymerized alkali silicate gel from the surface into the wellbore. By way of further example, the polymerized alkali silicate gel may be introduced by formation in the wellbore where the components were separately pumped. The polymerized alkali silicate gel and/or gel components may have bottom hole treating pressure approaching at or above the formation fracture pressure. In alternative embodiments, the polymerized alkali silicate gel and/or gel components may be pumped at matrix flow rates below formation fracture pressure. At block 106, the second fluid as described herein may be pumped into the wellbore behind the polymerized alkali silicate gel. At block 108, the second fluid may push the polymerized alkali silicate gel to the fault in the subterranean formation. Pumping of the second fluid may continue until polymerized alkali silicate gel is placed into any desired location within the subterranean formation 120. In some embodiments, the second fluid pushes the polymerized alkali silicate gel from the wellbore into the subterranean formation and to the fault. For example, the second fluid may push the alkali silicate gel in the subterranean formation until at least a portion of the polymerized alkali silicate gel is the fault. By way of further example, the second fluid may push the alkali silicate gel in the subterranean until a leading edge of the polymerized alkali silicate gel is near the fault. At block 110, the polymerized alkali silicate gel may be left in the subterranean formation for a prolonged period of time. In some embodiments, the period of time may be determined by the production life of the field of interest, and wherein the period of time may range from about 1 month to about 15 years. The polymerized alkali silicate fluid or gel may provide stability to the subterranean formation by sealing of fractures or other entry points, thereby providing a barrier between a zone or stimulation and a given fault.

FIG. 1 also depicts optional process steps that can be performed in placement of the alkali silicate gel in accordance with one or more embodiments. As indicate by line 112, the blocks 104 and 106 may be repeated so that the alkali silicate gel may be introduced into the wellbore into the wellbore followed by the second fluid, then another volume of the alkali silicate gel may be pumped immediately behind the second fluid and then followed by another volume of the second fluid. In other words, blocks 104 and 106 may be repeated one or more times before flushing the treatment into the subterranean formation. Line 114 indicates a process cycle similar to line 112 except that the steps of blocks 104 and 106 are not repeated until after block 108 that pushes the polymerized alkali silicate gel from the wellbore into the subterranean formation. Accordingly, as indicated by line 114, blocks 104, 106, and 108 may be repeated one or more times before the polymerized alkali silicate gel is left in the subterranean formation. As indicated by block 116, multiple zones may be treated by isolating with a frac plug or another suitable isolation method, such as a frac sleeve. The isolating may occur after block 108 pushes the polymerized alkali silicate gel into the subterranean formation or after block 110 leaves the polymerized alkali silicate gel into the subterranean formation. With the previously treated zone isolated, line 118 indicates that the process may return to block 104 to repeated blocks 104, 106, 108, and 110 as desired for another formation zone, above or above the zone previously treated.

Figure 2:
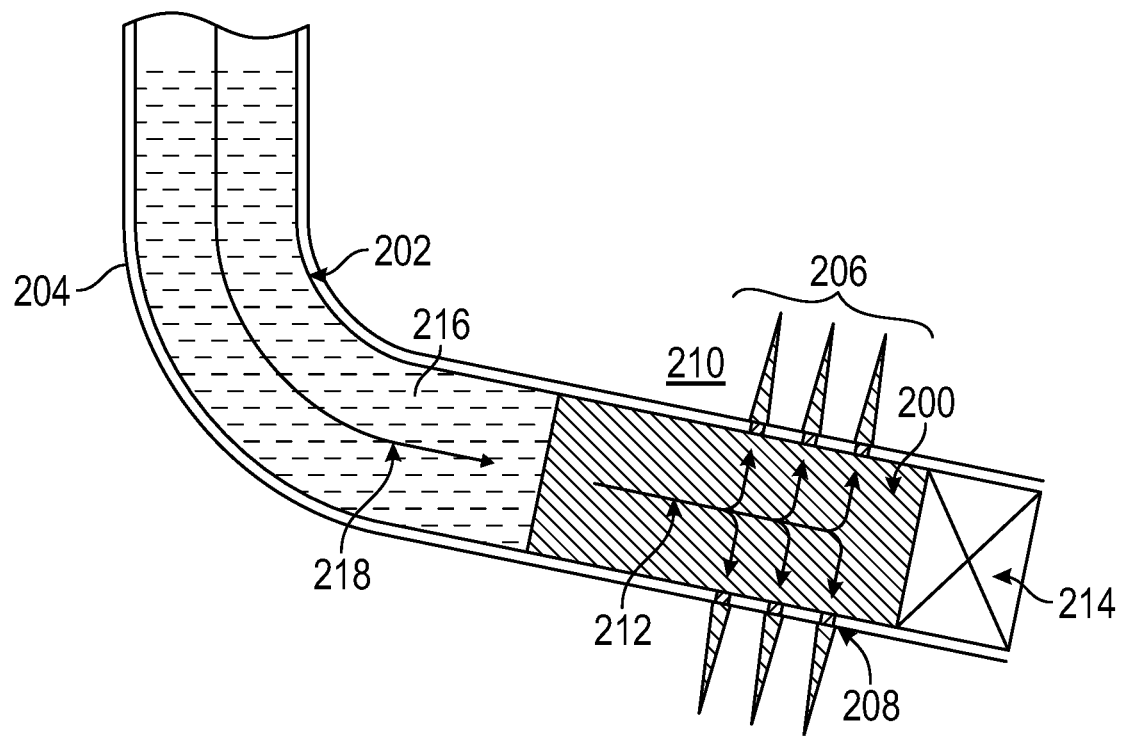
FIG. 2 illustrates a side plan view of a flow path of polymerized alkali silicate fluids in a cased subterranean wellbore, in accordance with some embodiments of the present disclosure.

FIG. 2 is a side plan view of illustrating use of a polymerized alkali silicate gel 200 in a cased wellbore 202, in accordance with some embodiments of the present disclosure. As illustrated, the cased wellbore 202 may be lined with casing 204 and includes a perforated interval 206. In the perforated interval 206, the cased wellbore 202 includes perforations 208 that provide fluid communication between the cased wellbore 202 and subterranean formation 210. In the illustrated embodiment, the polymerized alkali silicate gel 200 as discussed herein may be injected into the cased wellbore 202, wherein pressure directs the polymerized alkali silicate gel along flow path 212 until polymerized alkali silicate gel 200 contacts isolation plug 214 positioned beyond the perforated interval 206, wherein the isolation plug 212 may isolate a treatment zone from a downhole section of the cased wellbore 202. A second fluid 216 as discussed herein may be injected into the cased wellbore 202 behind the polymerized alkali silicate gel 200, wherein the flow path of the second fluid is depicted by flush fluid flow path 218. The pressure exerted by the second fluid 214 may force the polymerized alkali silicate fluid 200 along the flow path 206 and into the subterranean formation, thorough perforations 208. In some embodiments, the second fluid 214 may pumped at or above formation fracture pressures.

Figure 3:
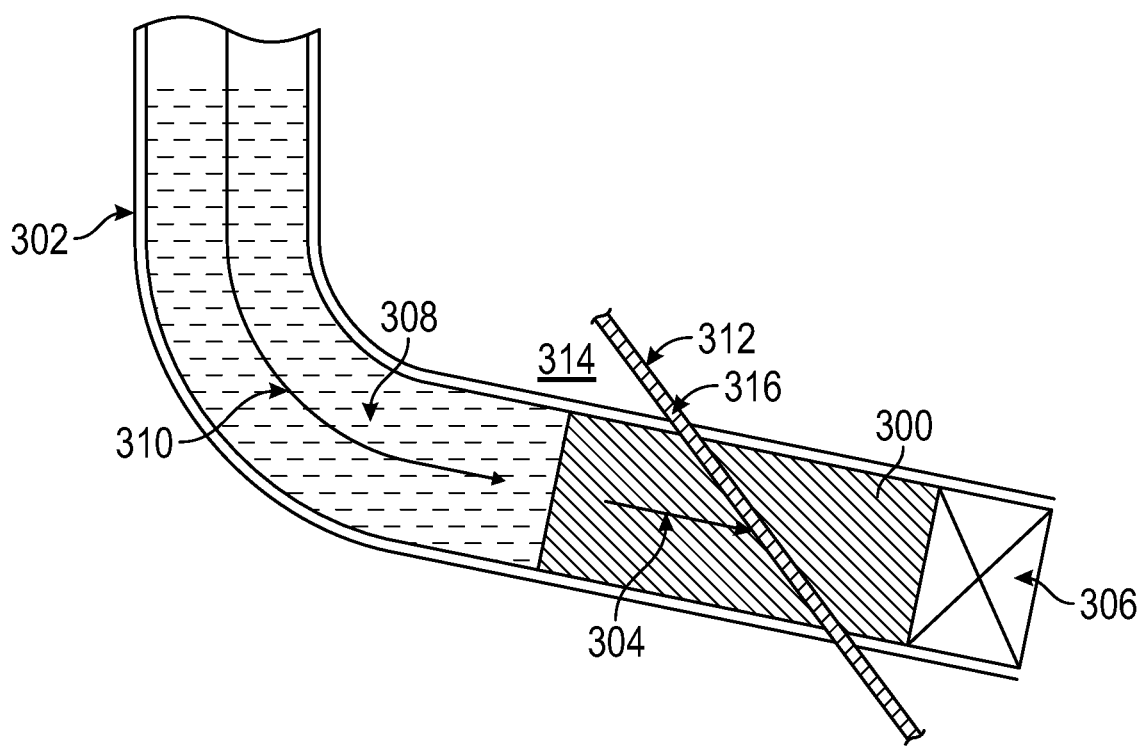
FIG. 3 illustrates a side plan view of a flow path of polymerized alkali silicate fluids in an open-hole subterranean wellbore without casing, in accordance with some embodiments of the present disclosure.

FIG. 3 is a side plan view illustrating use of a polymerized alkali silicate gel 300, in accordance with some embodiments of the present disclosure. In the illustrated embodiment, a polymerized alkali silicate gel 300 as discussed herein is introduced into an open-hole wellbore 302 along flow path 304 until the polymerized alkali silicate gel 300 contacts isolation plug 306 positioned in the uncased wellbore 302, wherein the isolation plug 306 may isolate a treatment zone from downhole portions of the open-hole wellbore 302. A second fluid 308 as discussed herein may be injected into the uncased wellbore 302 behind the polymerized alkali silicate gel 300, wherein the flow path of the second fluid 308 is depicted by flush fluid flow path 310. As illustrated, a fault 312 in subterranean formation 314 may intersect the uncased wellbore 302. The pressure exerted by the second fluid 308 assists with forcing the polymerized alkali silicate gel 304 from the uncased wellbore 302 and into the fault 312. As previously discussed, the polymerized alkali silicate gel may be allowed to remain in the wellbore as shown by reference number 316 and thus form a barrier.

Figure 4:
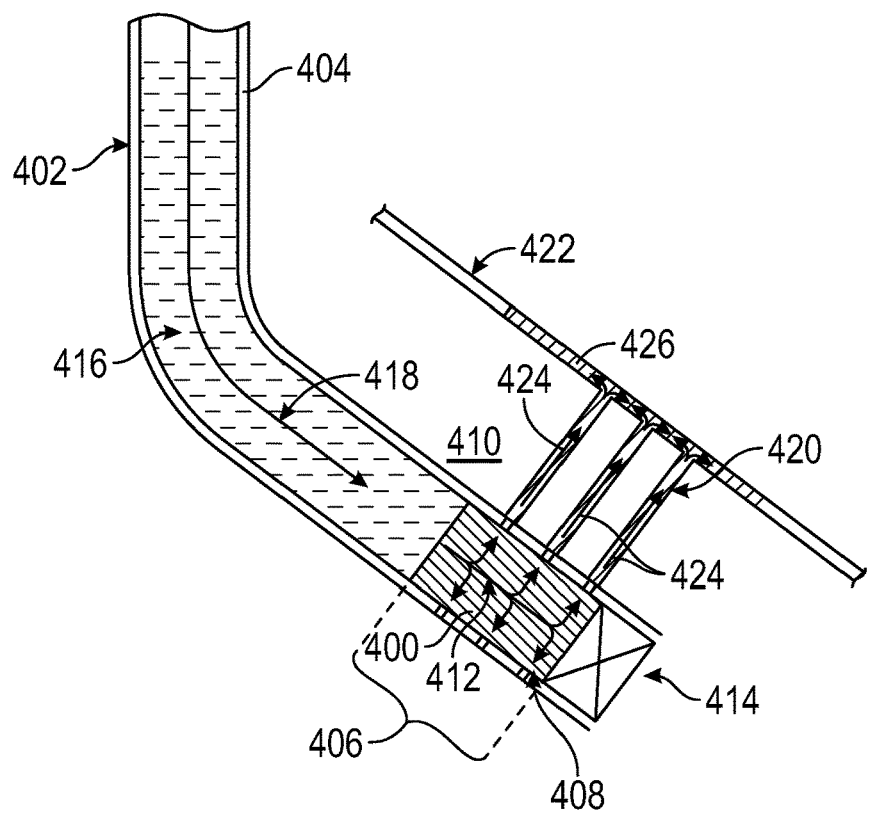
FIG. 4 illustrates an aerial view of a flow path of polymerized alkali silicate fluids in a subterranean wellbore with hydraulic fractures connected to a fault line, in accordance with some embodiments of the present disclosure.

FIG. 4 is an aerial view illustrating use of a polymerized alkali silicate gel 400, in accordance with some embodiments of the present disclosure. As illustrated, the polymerized alkali silicate gel 400 as discussed herein may be introduced into a cased wellbore 402. The cased wellbore 402 may be lined with casing 404 and includes a perforated interval 406. In the perforated interval 406, the cased wellbore 402 includes perforations 408 that provide fluid communication between the cased wellbore 402 and subterranean formation 410. In the illustrated embodiment, the polymerized alkali silicate gel 400 may be pumped into subterranean wellbore 402, wherein pressure may direct the polymerized alkali silicate along the fluid flow path 412 until the polymerized alkali silicate gel 400 contacts isolation plug 414, wherein the isolation plug 414 may isolate a treatment zone from downhole portions of the cased wellbore 402. A second fluid 416 as disclosed herein may be pumped into the cased wellbore 402 behind the polymerized alkali silicate gel 400, wherein the flow path of the second fluid is depicted by flush fluid flow path 418. In some embodiments, the polymerized alkali silicate gel 400 and the second fluid 416 may be pumped at or above fracture pressure to create or extend one or more fractures 420 in the subterranean formation 410 that extend from the cased wellbore 402. In some embodiments, the one or more fractures 420 may be natural fractures. As illustrated, the one or more fractures 420 may extend from the cased wellbore 402 to a fault 422 in the subterranean formation 410. The pressure exerted by the second flush fluid 416 assists with forcing the polymerized alkali silicate gel along fracture fluid flow path 424 into and through the one or more fractures 420 to the fault 422. As previously discussed, the polymerized alkali silicate gel may be allowed to remain in the wellbore as shown by reference number 426 and thus form a barrier.

Figure 5:
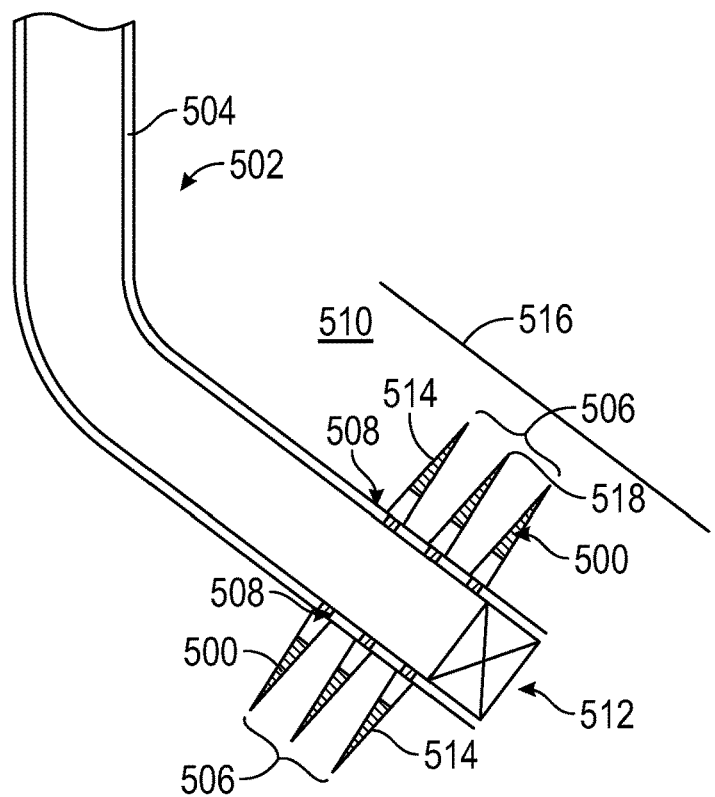
FIG. 5 illustrates an aerial view of placement of polymerized alkali silicate fluid in a subterranean wellbore with hydraulic fractures in close proximity to a fault line, in accordance with some embodiments of the present disclosure.

FIG. 5 is an aerial view illustrating use of a polymerized alkali silicate gel 500, in accordance with some embodiments of the present disclosure. As illustrated, a cased wellbore 502 may be lined with casing 504 and includes a perforated interval 506. In the perforated interval 506, the cased wellbore 502 includes perforations 508 that provide fluid communication between the cased wellbore 502 and subterranean formation 510. In the illustrated embodiment, an isolation plug 512 is positioned beneath the perforated interval 506 to isolates a completed treatment zone from downhole portions of the cased wellbore 502. As depicted, one or more fractures 514 extend from the cased wellbore 502 into the subterranean formation 510. In the illustrated embodiment, the subterranean formation 510 further contains a fault 516. To form a barrier, a polymerized alkali silicate gel 500 is disposed in the subterranean formation 510 with a leading edge 518 of the polymerized alkali silicate gel 500 near the fault 516, for example, about 10 miles or closer to the fault 516. As illustrated, the polymerized alkali silicate gel 500 may be positioned in the one or more fractures 514 with the leading edge 518 about 10 miles or closer to the fault 516, thereby sealing the one or more fractures 514. The sealing of one or more fractures 514 may stabilize and prevent expansion of the one or more fractures 514 to fault 516.

Accordingly, the present disclosure may provide methods that use polymerized alkali silicate gels. The methods, systems, and compositions may include any of the various features disclosed herein, including one or more of the following statements.

Statement 1. A method comprising: introducing a polymerized alkali silicate gel into a subterranean formation containing a fault, wherein the polymerized alkali silicate gel is introduced the subterranean formation such that at least a leading edge of polymerized alkali silicate gel is placed in the fault or within about 10 miles from the fault.

Statement 2. The method of statement 1 further comprising forming the polymerized alkali silicate gel, wherein the formatting comprises combining at least an aqueous acid solution with an aqueous alkali metal silicate having a pH greater than about 11.

Statement 3. The method of statement 2 wherein the aqueous alkali metal silicate comprises at least one alkali metal silicate selected from the group consisting of sodium silicate, potassium silicate, lithium silicate, rubidium silicate, cesium silicate, and combinations thereof.

Statement 4. The method of statement 2 or statement 3, wherein the aqueous acid solution comprises at least one inorganic acid selected from the group consisting of hydrochloric acid, sulfuric acid, phosphoric acid, nitric acid, and combinations thereof.

Statement 5. The method of statement 2 or statement 3, wherein the aqueous acid solution comprises an organic acid selected from the group consisting of formic acid, acetic acid, and combinations thereof.

Statement 6. The method of statement 2 or statement 3, wherein the aqueous acid solution comprises 20% to 40% by weight of hydrochloric acid.

Statement 7. The method of any preceding statement, wherein proppant is suspended in the polymerized alkali silicate gel, wherein the proppant is fine mesh having a particle size of about 100 mesh or smaller.

Statement 8. The method of any preceding statement, wherein a degradable diverter is suspended in the polymerized alkali silicate gel, where the degradable diverter comprises a degradable polymer.

Statement 9. The method of any preceding statement, wherein the polymerized alkali silicate gel further includes a gelling agent.

Statement 10. The method of any preceding statement, further comprising introducing at least a degradable diverter into the subterranean formation behind the polymerized alkali silicate gel, wherein the degradable diverter comprises a degradable polymer.

Statement 11. The method of any preceding statement, further comprising forming the polymerized alkali silicate gel at the surface and then introducing the polymerized alkali silicate gel into the subterranean formation through a wellbore.

Statement 12. The method of any one of statements 1 to 10, further comprising separately introducing gel components into a wellbore such that the polymerized alkali silicate gel is formed downhole.

Statement 13. The method of any preceding statement, further comprising introducing a second fluid into a wellbore to push the polymerized silicate gel from the wellbore and into the subterranean formation.

Statement 14. The method of statement 13, wherein the second fluid pushes the leading edge of the polymerized alkali silicate gel into the fault.

Statement 15. The method of statement 14, wherein the second fluid is at or above fracturing pressure such that the polymerized alkali silicate gel extends the one or more fractures to the fault.

Statement 16. The method of any one of statements 13 to 15, wherein the second fluid is positioned in one or more fractures between the fault and the wellbore.

Statement 17. The method of any preceding statement, further comprising fracturing the subterranean formation with the polymerized alkali silicate gel in the subterranean formation.

Statement 18. A method comprising: forming a polymerized alkali silicate gel, wherein the polymerized alkali silicate gel is formed by combining at least an aqueous acid solution with an aqueous alkali metal silicate having a pH greater than about 11; introducing the alkali metal silicate gel into a wellbore; introducing a second fluid into the wellbore to push the alkali metal silicate gel from the wellbore and into a subterranean formation containing a fault, wherein the second fluid pushes the polymerized alkali metal gel in the formation such that a leading edge of the alkali metal silicate gel is placed in the fault or within about 10 miles of the fault; and fracturing the subterranean formation with a fracturing fluid with the alkali metal silicate gel in the subterranean formation.

Statement 19. The method of statement 18, wherein the fracturing fluid is introduced into the subterranean formation through a stimulation wellbore while the polymerized alkali silicate was introduced through the wellbore, the wellbore being offset from the stimulation wellbore.

Statement 20. The method of statement 18 or statement 19, further comprising introducing at least a degradable diverter and/or proppant into the subterranean formation behind the polymerized alkali silicate gel, wherein the degradable diverter comprises a degradable polymer, wherein the proppant is fine mesh having a particle size of about 100 mesh or smaller.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method comprising:
   introducing a polymerized alkali silicate gel into a subterranean formation containing a fault, wherein the polymerized alkali silicate gel is introduced into the subterranean formation such that at least a leading edge of polymerized alkali silicate gel is placed in the fault or within about 10 miles from the fault;
   forming a barrier with the polymerized alkali silicate gel between a wellbore and the fault; and
   after forming the barrier, fracturing the subterranean formation with a fracturing fluid, wherein the barrier prevents expansion of one or more fractures to the fault.

2. The method of claim 1 further comprising forming the polymerized alkali silicate gel, wherein the forming comprises combining at least an aqueous acid solution with an aqueous alkali metal silicate having a pH greater than about 11.

3. The method of claim 2 wherein the aqueous alkali metal silicate comprises at least one alkali metal silicate selected from the group consisting of sodium silicate, potassium silicate, lithium silicate, rubidium silicate, cesium silicate, and combinations thereof.

4. The method of claim 2, wherein the aqueous acid solution comprises at least one inorganic acid selected from the group consisting of hydrochloric acid, sulfuric acid, phosphoric acid, nitric acid, and combinations thereof.

5. The method of claim 2, wherein the aqueous acid solution comprises an organic acid selected from the group consisting of formic acid, acetic acid, and combinations thereof.

6. The method of claim 2, wherein the aqueous acid solution comprises 20% to 40% by weight of hydrochloric acid.

7. The method of claim 1, wherein proppant is suspended in the polymerized alkali silicate gel, wherein the proppant is fine mesh having a particle size of about 100 mesh or smaller.

8. The method of claim 1, wherein a degradable diverter is suspended in the polymerized alkali silicate gel, where the degradable diverter comprises a degradable polymer.

9. The method of claim 1, wherein the polymerized alkali silicate gel further includes a gelling agent.

10. The method of claim 1, further comprising introducing at least a degradable diverter into the subterranean formation behind the polymerized alkali silicate gel, wherein the degradable diverter comprises a degradable polymer.

11. The method of claim 1, further comprising forming the polymerized alkali silicate gel at the surface and then introducing the polymerized alkali silicate gel into the subterranean formation through a wellbore.

12. The method of claim 1, further comprising separately introducing gel components into a wellbore such that the polymerized alkali silicate gel is formed downhole.

13. The method of claim 1, further comprising introducing a second fluid into a wellbore to push the polymerized silicate gel from the wellbore and into the subterranean formation.

14. The method of claim 13, wherein the second fluid pushes the leading edge of the polymerized alkali silicate gel into the fault.

15. The method of claim 14, wherein the second fluid is at or above fracturing pressure such that the polymerized alkali silicate gel extends the one or more fractures to the fault.

16. The method of claim 13, wherein the second fluid is positioned in one or more fractures between the fault and the wellbore.

17. The method of claim 1, further comprising fracturing the subterranean formation with the polymerized alkali silicate gel in the subterranean formation.

18. A method comprising:
   forming a polymerized alkali silicate gel, wherein the polymerized alkali silicate gel is formed by combining at least an aqueous acid solution with an aqueous alkali metal silicate having a pH greater than about 11;
   introducing the alkali metal silicate gel into a wellbore;
   introducing a second fluid into the wellbore to push the alkali metal silicate gel from the wellbore and into a subterranean formation containing a fault, wherein the second fluid pushes the polymerized alkali metal gel in the formation such that a leading edge of the alkali metal silicate gel is placed in the fault or within about 10 miles of the fault, and wherein the alkali metal silicate gel forms a barrier between the wellbore and the fault; and fracturing the subterranean formation with a fracturing fluid with the alkali metal silicate gel in the subterranean formation, wherein the barrier prevents expansion of one or more fractures to the fault.

19. The method of claim 18, wherein the fracturing fluid is introduced into the subterranean formation through a stimulation wellbore while the polymerized alkali silicate was introduced through the wellbore, the wellbore being offset from the stimulation wellbore.

20. The method of claim 18, further comprising introducing at least a degradable diverter and/or proppant into the subterranean formation behind the polymerized alkali silicate gel, wherein the degradable diverter comprises a degradable polymer, wherein the proppant is fine mesh having a particle size of about 100 mesh or smaller.

* * * * *